United States Patent [19]

Ray

[11] 4,408,246
[45] Oct. 4, 1983

[54] PROTECTIVE RELAY APPARATUS

[75] Inventor: Roger E. Ray, Coral Springs, Fla.

[73] Assignee: Westinghouse Electric Corp., Pittsburgh, Pa.

[21] Appl. No.: 339,031

[22] Filed: Jan. 13, 1982

[51] Int. Cl.³ .......................... H02H 7/26; H02H 3/28
[52] U.S. Cl. ........................................ 361/64; 361/87; 361/78; 361/85; 361/62
[58] Field of Search .................. 361/64, 65, 66, 67, 361/68, 76, 78, 87, 85, 62, 63, 36

[56] References Cited

U.S. PATENT DOCUMENTS

| | | | |
|---|---|---|---|
| 2,641,634 | 6/1953 | Marihart | 361/76 X |
| 3,597,735 | 8/1971 | Nakayama et al. | 361/64 X |
| 4,020,396 | 4/1977 | Gambale et al. | 361/64 |
| 4,275,429 | 6/1981 | Church et al. | 361/64 |
| 4,322,768 | 3/1982 | Maeda et al. | 361/64 |

OTHER PUBLICATIONS

"Applied Protective Relaying"-Westinghouse Electric Corp., Relay Instrument Division Coral Springs, Florida 33060-1979.

Primary Examiner—Patrick R. Salce
Attorney, Agent, or Firm—D. R. Lackey

[57] ABSTRACT

A protective relay system for providing pilot protection for two and three terminal alternating current transmission lines, which system does not require a continuous metallic circuit between the relaying points. The evaluation circuit develops operating and restraining quantities, modified by a predetermined constant which determines the operating characteristic of the relay system.

11 Claims, 5 Drawing Figures

PROTECTIVE RELAY APPARATUS

BACKGROUND OF THE INVENTION

1. Field of the Invention

The invention relates in general to protective relays, and more specifically to protective relays for protecting high-voltage transmission line sections in a three-phase electrical power system.

2. Description of the Prior Art

Pilot protection for high-voltage electrical transmission lines identifies faults on the protected line section by using communication channels for relays to compare system conditions at the terminals or ends of the line section. For economic reasons, power line carrier or microwave pilot channels are used for long transmission lines, and pilot-wire relaying is used for protecting short transmission line sections, i.e., usually about ten miles, or less. Pilot-wire relaying is very important, as in short high-voltage lines, discrimination is difficult with distance type-relays, making pilot relaying the only practical method of discrimination not based on time delay.

The electromechanical pilot-wire relays of the prior art require a continuous metallic circuit between the terminals of the protected line section. A composite sequence filter at each terminal converts the three-phase currents into a single-phase voltage, and the single-phase voltage is applied to the pilot-wire pair for comparison with the other end single-phase voltage. The protective relay at each terminal is an electromechanical relay which includes an operating coil and a restraint coil. The operating and restraint coils are connected in the pilot-wire system such that with normal through current in the protected line section, the polarities of the two single-phase voltages developed by the composite sequence filters cause more current to flow in the restraint coils than in the operating coils. An internal fault, i.e., a fault in the protected section, causes one of the single-phase voltages to shift its phase angle and then the instantaneous polarities are such that more current flows through the operating coils than through the restraint coils, causing the relays to simultaneously trip their associated circuit breakers to clear the protected transmission line section.

The comparison and decision making element of the electromechanical pilot-wire is a polar unit which includes the operating and restraint coils. A unique feature of this relay is the interaction of the 60 Hz quantities on the pilot wire, which interaction is a part of the decision making process of the electromechanical relay system.

The electromechanical pilot-wire relay system securely, reliably and economically provides high speed simultaneous clearing of the line terminals of a protected transmission line section due to a fault in the protected section. Continuous, end-to-end metallic circuits, for use in pilot-wire relaying, which are typically leased from a telephone company, are becoming increasingly more difficult to obtain, or even retain. Thus, there is a need for a new and improved pilot relaying system which has the desirable characteristics of discriminatory in-phase and out-of-phase tripping, and the economic attractiveness of the pilot-wave relaying system, but which does not require that the communication link be a continuous metallic circuit.

U.S. Pat. No. 4,275,429, which is assigned to the same assignee as the present application, discloses such a relay which may use a non-continuous communication channel, such as a low grade, uninterruptible dedicated telephone line. A dedicated telephone line maintains an open channel at all times, but it has relatively low current capability, and it is not a continuous metallic circuit, as it may include amplifiers and switchboards in the circuit. The relaying system of this patent is also suitable for use with an optical link, i.e., a light pipe, microwave, or power line carrier.

The evaluation function in the relaying system of U.S. Pat. No. 4,275,429 is completely different than the functioning of the decision element of the electromechanical relay. It provides a vector or phasor combination of the local and remote signals, and it provides a true decision signal when the result exceeds a predetermined magnitude. It also determines the phase angle between the local and remote signals, and it provides a true decision signal when the angle is in a predetermined range. If these two decision signals are simultaneously true, it indicates a fault in the protected line section, and each relay will generate a trip signal for its associated circuit breaker. While this evaluation circuit provides excellent results, market acceptance of a solid-state relay which replaces an electromechanical relay is more rapidly obtained when its functioning can be explained with reference to the functions of the electromechanical relay. Thus, it would be desirable to provide a new and improved solid-state relay for pilot protection which has the ability to use a non-continuous communication channel, but which functions broadly in a manner similar to the electromechanical pilot-wire relay. Since the continuous pilot wire is not used, the solid-state relay must modulate the 60 Hz quantity on a channel of high frequency, and thus the hereinbefore mentioned interaction of the quantities obtainable with the pilot wire does not occur, and it must be replaced by other means if the solid-state relay is to functionally compare with the electromechanical relay.

SUMMARY OF THE INVENTION

Briefly, the present invention is a new and improved solid-state pilot protective relaying system which may use a non-continuous communication channel, such as a dedicated telephone line, or some other form of channel such as an optical link, microwave, or power line carrier. The new pilot protective relaying system is an all solid-state system which includes a relay at each terminal of a two or three terminal line for comparing voltage wave forms responsive to the current flowing at the near and far terminals. The communication link is only required to transmit a replica of the current derived voltage wave form appearing at each end, to the other end, or ends, where the wave form is reconstituted for comparison with the local current derived voltage wave form. The same composite sequence filters used in prior art pilot-wire electromechanical systems to develop a single-phase composite sequence voltage in response to the three-phase currents may be used to generate the wave forms, or, the composite sequence filters may be constructed of operational amplifiers. Pulse period modulation is a preferred form of communication because the filtering requirements in the demodulator are miniscule, but frequency modulation, or any other suitable communication link, may be used.

The relay of the present invention is a different type relay having an evaluation circuit which provides an "operate" quantity in response to a vector combination of the current "in" and the current "out" of the zone of protection. The evaluation circuit also provides a restraint quantity which may be the sum of the absolute values of the local and remote signals, or the value of the maximum remote signal, as desired. Thus, similar to the electromechanical relay, the solid-state relay of the present invention produces both operating and restraining quantites. These quantities must now be compared in a way which will indicate whether a detected fault is internal to the protected line section, or external to the protected line section. It has been found that such a comparison may be made according to the following relationship:

$$V_{op} \geqq (V_R/G) + V_B$$

where $V_{op}$ is the operating quantity, $V_R$ is the restraint quantity, G is a predetermined constant, and $V_B$ is a predetermined pickup level or bias. The value of G must be greater than one in order for $V_{op}$ to exceed $V_R/G$. G may be used to modify $V_R$ by decreasing its value, or it may be used to increase the value of $V_{op}$, as desired. It has been further found that changing G changes the operating characteristic of the relay, and thus the value of G will be selected according to the desired operating characteristic of the relay.

BRIEF DESCRIPTION OF THE DRAWING

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
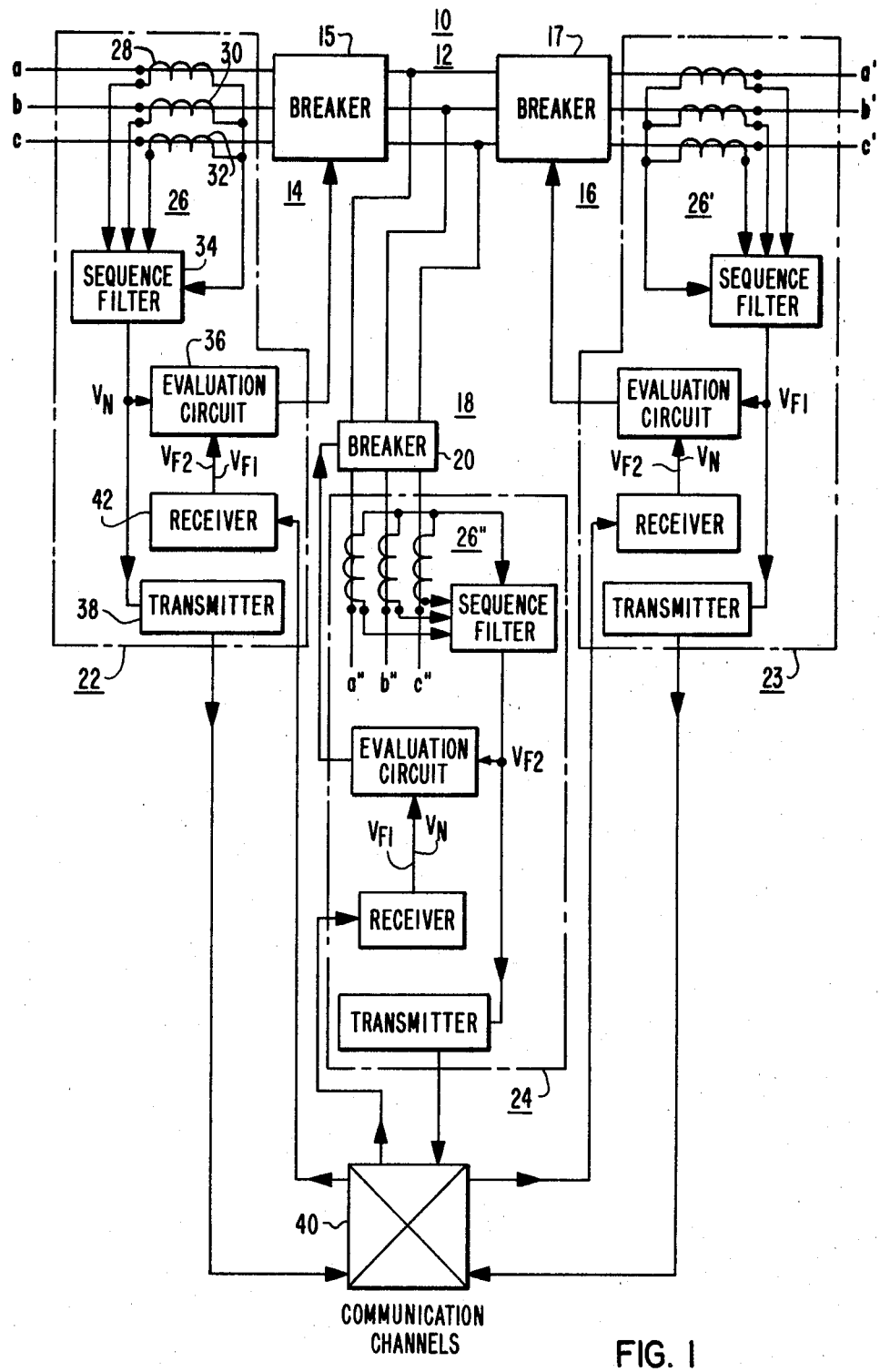
FIG. 1 is a block diagram of pilot protective relaying apparatus constructed according to the teachings of the invention.

Referring now to the drawings, and to FIG. 1 in particular, there is shown a new and improved protective relaying system 10 for providing pilot protection for a transmission line section 12. The protected section 12 may be a two or a three terminal line, with a three terminal line being shown for purposes of example. Transmission line section 12 includes a local or near terminal 14 comprising a circuit breaker 15, with circuit breaker 15 interconnecting one end of line section 12 with a high-voltage, three-phase a.c. electrical power system having conductors a, b and c. Transmission line section 12 further includes a first remote or far terminal 16 comprising a circuit breaker 17, with circuit breaker 17 interconnecting another end of line section 12 with a high-voltage, three-phase a.c. electrical power system having conductors a', b' and c'. Transmission line section 12 also includes a second remote or far terminal 18 having a circuit breaker 20 interconnecting the remaining end of line section 12 with a high-voltage, three-phase AC electrical power system having conductors a'', b'' and c''. Terminals 14, 16 and 18 additionally include similar protective relaying apparatus 22, 23 and 24, respectively. Since the protective relaying apparatus 22, 23 and 24 at each terminal are similar, only the protective relaying apparatus 22 associated with the near terminal 14 will be described in detail. The functions at the far terminals 16 and 18 will be given the same reference numerals as like functions at the near terminal, with the addition of a single or double prime mark.

Protective relaying apparatus 22 includes means 26 for obtaining a current derived single-phase composite sequence voltage signal $V_N$ responsive to the three phase currents flowing in conductors a, b and c, and the $3I_0$ or ground circuit. Means 26 includes current transformers 28, 30 and 32, and a composite sequence filter 34 which mixes predetermined percentages of positive, negative and/or zero sequence currents from the three phases to obtain a single-phase composite sequence voltage whose phase is responsive to the direction of power flow, and whose magnitude is responsive to the current magnitudes in the three phases. The same composite sequence filters now used by the prior art electromechanical pilot-wire relays may be used, with U.S. Pat. No. 2,183,646 describing a composite sequence filter which may be used, or, the composite sequence filters may be solid state, constructed of operational amplifiers.

The current derived composite sequence signal or voltage $V_N$ is applied to an evaluation circuit 36, and also to a transmitter 38. The wave form of voltage signal $V_N$ is used as the modulating wave form for the type of communication selected for transmitter 38. For example, transmitter 38 may transmit pulses at a predetermined nominal rate in response to a modulating signal of zero magnitude, with the rate increasing, and decreasing, as signal $V_N$ increases and decreases, respectively, from zero. This pulse period modulation is a preferred form of communication because it requires very little filtering in the demodulator, but other forms of communication may be used, such as frequency modulation. The center or nominal frequency may be chosen for the specific type of communication link 40 employed. Since the attenuation and envelope delay versus frequency will be known for the specific channel selected, the nominal pulse rate should be selected to minimize both attenuation and envelope delay. For example, in a dedicated uninterruptible Bell system 3002 channel, a narrow band of approximately 300 Hz around a center frequency of approximately 1.7 KHz provides minimum attenuation and envelope delay.

Protective relaying apparatus 22 also includes a receiver 42 connected to the communication link 40, which receives communication signals responsive to the current derived single-phase composite sequence voltage signals $V_{F1}$ and $V_{F2}$ from the far terminals 16 and 18. Receiver 42 demodulates the communiation signals to provide signals $V_{F1}$ and $V_{F2}$ in a form suitable for comparison with signal $V_N$ in the evaluation circuit 36.

For normal through current, i.e, no fault in the protected transmission line section 12, and using the ct connections shown in FIG. 1, signal $V_N$ will, ideally, be 180 degrees out of phase with at least one of the signals $V_{F1}$ or $V_{F2}$. When a fault occurs in the protected line section 12, current flow will be into the polarity marked terminals of the ct's, and signals $V_N$, $V_{F1}$ and $V_{F2}$ will all, ideally, be in phase. In practice, they will not be exactly in phase during an internal fault due to a variety of reasons. For example, differences in the composite sequence filter networks 34, 34' and 34", current transformer saturation, and phase angle differences in the current entering the ends of the protected line section because of phase angle differences in the driving system voltages at the ends of the transmission line, all contribute to a change in the phase angles.

The evaluation circuits 36, 36' and 36" compare the single-phase voltage wave forms of the current derived signals $V_N$, $V_{F1}$ and $V_{F2}$ according to the teachings of the invention, and if a fault is detected within the protected line section 12, trip signals are applied to their associated circuit breakers 15, 17 and 20 to clear the transmission line section 12.

Figure 2:
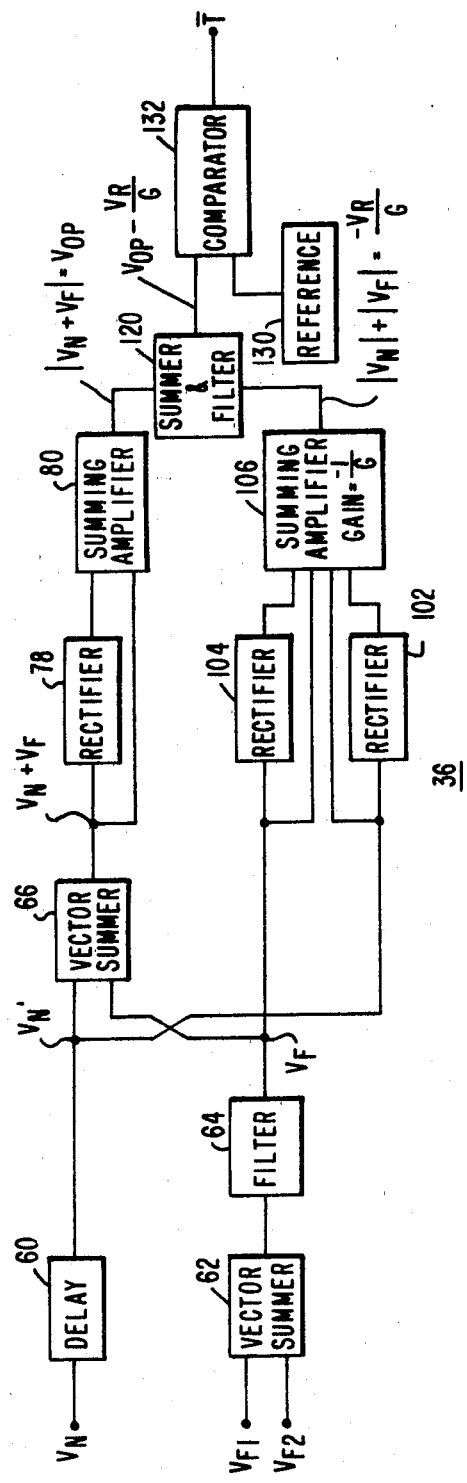
FIG. 2 is a detailed block diagram of the evaluation circuit shown in FIG. 1.
Figure 3:
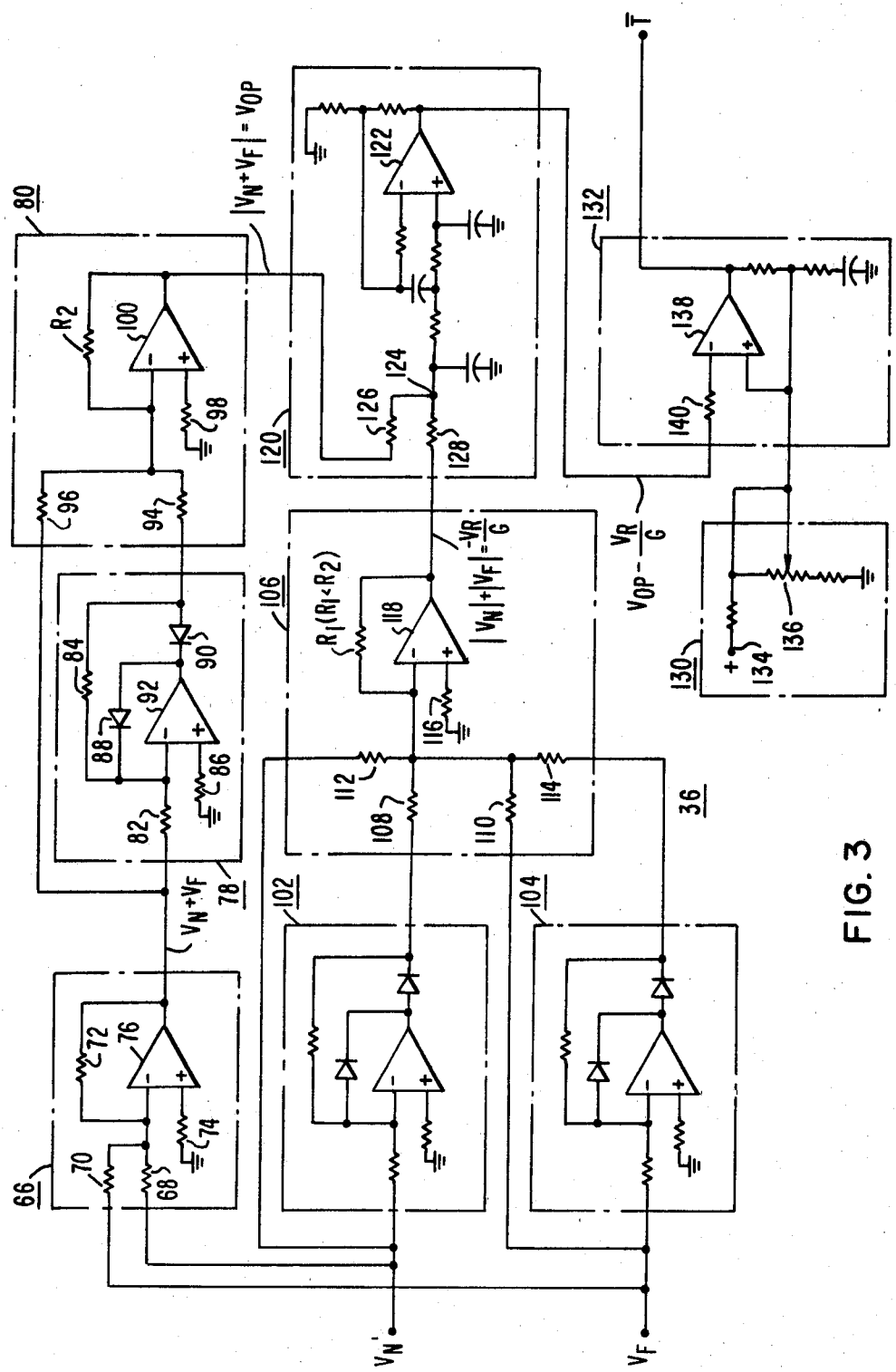
FIG. 3 is a schematic diagram of an exemplary implementation of the evaluation circuit shown in FIG. 2.

FIG. 2 is a block diagram which functionally illustrates the evaluation steps performed by evaluation circuit 36, and FIG. 3 is a schematic diagram which illustrates an exemplary implementation of the evaluation circuit 36. FIGS. 2, 3 will both be referred to in the following description.

More specifically, signal $V_N$ is applied to a phase shift or delay circuit 60, such as an operational amplifier (op-amp) connected as a non-inverting delay circuit. The delay angle is selected to compensate for the delay characteristic of the specific communication link 40, delaying signal $V_N$ by the same delay suffered by signals $V_{F1}$ and $V_{F2}$. Signal $V_N$ is referenced $V_N'$ immediately after delay 60, in FIGS. 2 and 3, but the prime mark is then dropped thereafter in order to simplify the equations.

Signals $V_{F1}$ and $V_{F2}$ are vectorially summed in a summer 62, such as by an op amp connected in a summing configuration, and the resultant vector or phasor is applied to a low-pass filter 64 to remove any transients and high-frequency noise from the signal, such as by utilizing an op amp connected in the non-inverting, multiple-feedback, low-pass filter connection. The filtered signal is referenced $V_F$. If the protected section is a two-terminal section, one of the far or remote signals would simply be zero.

The operate quantity $V_{op}$ is developed according to the following expression:

$$V_{op} = |V_N + V_F| \tag{1}$$

In other words, signals $V_N$ and $V_F$ are vectorially combined and the resultant is rectified. Using the ct connections shown in FIG. 1, the vector combination is accomplished by vector summer 66. Vector summer 66, as shown in FIG. 3, may be provided by an adder or summing network comprising resistors 68, 70, 72 and 74, and an op amp 76. Resistors 68 and 70 connect signals $V_N$ and $V_F$ to the inverting input of op amp 76, resistor 72 is the feedback resistor, and resistor 74 connects the non-inverting input to ground. The vector sum $V_N + V_F$ is full-wave rectified by a rectifier 78 and a summing amplifier 80. Rectifier 78 is a precision half-wave rectifier which includes resistors 82, 84 and 86, diodes 88 and 90, and an op amp 92. Resistor 82 connects the output of op amp 76 to the inverting input of op amp 92, and resistor 86 connects its non-inverting input to ground. Diode 88 connects the output of op amp 92 to its inverting input, with the anode of diode 88 being connected to the output of the op amp. Diode 90 has its cathode connected to the output of op amp 92, and resistor 84 connects the anode of diode 90 to the inverting input of op amp 92. Summing circuit 80 includes resistors 94, 96, 98 and R2, and op amp 100. Resistor 94 connects the output of rectifier 78 to the inverting input of op amp 100, and resistor 96 connects the output of op amp 76 to the inverting input of op amp 100. Resistor R2 is the feedback resistor in an inverting amplifier configuration, and resistor 98 connects the non-inverting input of op amp 100 to ground. The output of summer 80 is the full-wave rectification of $V_N + V_F$, with positive going half cycles, and it is the operating quantity $V_{op}$.

The restraining quantity $V_R$ is developed according to the following expression:

$$V_R = |V_N| + |V_F| \tag{2}$$

In other words, signals $V_N$ and $V_F$ are each rectified and then summed. Signal $V_N$ is rectified in a precision half-wave rectifier 102, and signal $V_F$ is rectified in a precision half-wave rectifier 104. The outputs of rectifiers 102 and 104, and signals $V_N$ and $V_F$ are applied to a summing amplifier. Summing amplifier 106 includes resistor 108, 110, 112, 114, 116 and R1, and an op amp 118. Resistors 108, 110, 112 and 114 respectively connect the outputs of rectifiers 102 and 104 and signals $V_N$ and $V_F$ to the inverting input of op amp 118. Resistor R1 is the feedback resistor, and resistor 116 connects the non-inverting input of op amp 118 to ground. A fault in the protected section 12 is indicated, according to the teachings of the invention, when the operating quantity $V_{op}$ is equal to or greater than the restraining quantity divided by a predetermined constant G, plus a predetermined bias or pick-up value $V_B$. This relationship is expressed as follows:

$$V_{op} \geq (V_R/G) + V_B \tag{3}$$

The magnitude of the operating quantity $V_{op}$ cannot exceed the restraint quantity $V_R$ unless the constant G is greater than one. Thus, the constant G is chosen to be larger than one. The specific value of constant G is selected according to the desired operating characteristic of the relay system, as will be hereinafter explained.

Since the addition of the bias $V_B$ is a separate function performed after the comparison of quantities of $V_{op}$ and $V_R$, the constant G may be used to increase signal $V_{op}$, or to decrease signal $V_R$, as desired. For purposes of example, the constant G has been chosen to decrease signal $V_R$. If resistors R1 and R2 are equal, the constant G would be equal to one, which would make the relay inoperative. The constant G may be increased above the value one by making R1 less than R2. This ratio of R1 to R2 is selected to provide the desired operating characteristic of the delay.

Since according to expression (3), the restraining quantity $V_R/G$ is subtracted from the operating quantity $V_{op}$ prior to the comparison with the bias $V_B$, the output of summing amplifier 106 may be made negative by connecting the precision rectifiers 102 and 104 as shown in FIG. 3. Thus, the output of summing amplifier 106 is negative voltage half cycles, and the difference $V_{op} - V_R/G$, may be obtained by summing signals $V_{op}$ and $-V_R/G$ in a summer 120. Filtering for averaging and buffering may also be performed in summer 120, by an op amp 122 connected as an active filter. Signals $V_{op}$ and $-V_R/G$ are applied to a summing junction 124 via resistors 126 and 128, respectively, and junction 124 provides the input to the active filter.

The output of summer and filter 120, which is responsive to $V_{op} - V_R/G$, is then compared with a preset pick-up or bias value provided by a reference source 130 in a comparator or level detector 132. Reference 130 may include a unidirectional voltage source 134 and an adjustable voltage divider 136, with the reference voltage being applied to the non-inverting input of an op amp 138, which is used in the comparator function 132. The quantity $V_{op}-V_R/G$ is applied to the inverting input of op amp 138 via a resistor 140. The output signal T is low true. When signal $V_{op}-V_R/G$, is less than the reference, signal T is high, indicating no fault in the protected section. When signal $V_{op}-V_R/G$ equals or exceeds the reference, signal T will go low, indicating a fault in the protected section. Signal T may be used in a trip circuit for the associated circuit breaker 15.

Figure 4:
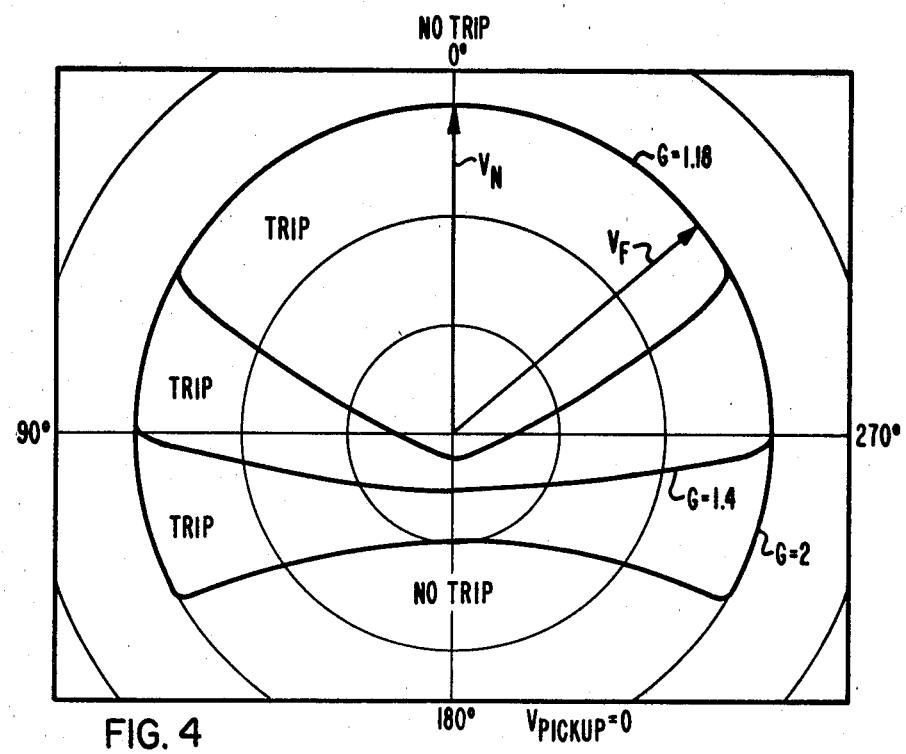
FIG. 4 is a graph which illustrates operating characteristic of the protective relaying apparatus shown in FIGS. 1, 2 and 3, for different values of the constant G.

FIG. 4 is a graph which illustrates how the selection of the constant G shapes the operating characteristic of the protected relay apparatus 10. The curve for each value of G was determined using zero for the bias $V_B$. Thus, the curves are developed from the expression $$V_{op} \geq V_R/G$$

or $$|V_N+V_F| - [(|V_N| + |V_F|)/G] \geq 0$$

with the larger of the local or remote quantities $V_N$ and $V_F$, respectively, being the reference vector at 0°. The trip area is inside the curves. The curve for the constant G of 1.4 shows that the relay trip characteristic will be about 90°. In other words, if the two vectors $V_N$ and $V_F$ are inphase by ±90°, the relay will provide a true trip signal regardless of the magnitude of the two vectors. For angles exceeding 90°, the relative magnitudes determine the trip characteristic. At an angle of 180°, the relay will provide a true trip signal for only a very low magnitude of current on the comparing vector. This means that the relay will provide a true trip signal for an internal fault with some outfeed at one terminal.

Figure 5:
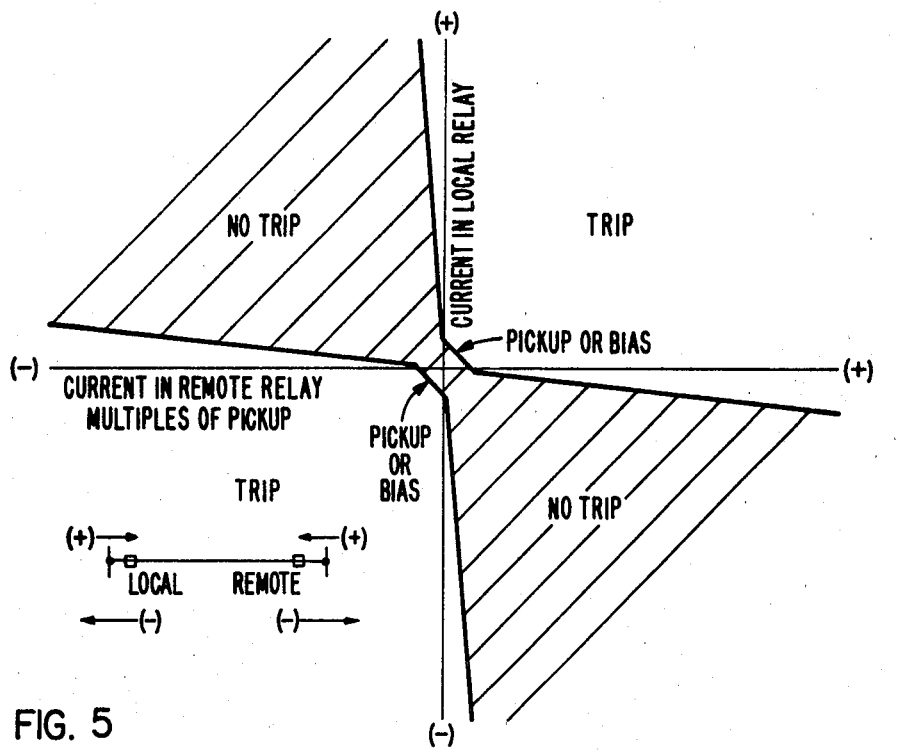
FIG. 5 is a graph which illustrates the tripping characteristics of the protective relaying apparatus shown in FIGS. 1, 2 and 3.

FIG. 5 shows the complete tripping characteristic of relay 10, with the abscissa plotting current magnitude in the remote or far relay in multiples of pickup, and the ordinate plotting current magnitudes in the local relay in multiples of pickup. The current flow directions are positive at each end of the protected line section when current flow is into the protected section, and negative at each end when the flow is out of the protected section. When the direction is positive at each end, or negative at each end, an internal fault is indicated, and a true trip signal T will be provided. Note that the two lines near the original marked "pickup" or "bias" are the result of adding some value to $V_B$ in equation (3). If this were not done, the relay would trip all the way down to zero current, which would be undesirable.

In summary, there has been disclosed new and improved solid-state pilot protective relay apparatus which does not require a continuous metallic circuit for the communication channel, and which operates by interrelating operating and restraining qualities developed by the relay. The interrelationship includes means for modifying one of the quantities by a predetermined constant, the value of which determines the operating characteristic of the relay.

I claim as my invention:

1. A protective relay system for providing pilot protection for an alternating current transmission line section having circuit interrupting means at its near and far ends to be protectively controlled, comprising:
   line current deriving means at the near and far ends of the line section, providing near and far composite sequence signals responsive to the magnitudes and phases of the line currents at the near and far ends, respectively,
   communication means communicating the far signal to the near end,
   first means providing an operating quantity in response to the absolute value of the vector combination of said near and far signals, with said vector combination being selected such that the absolute value thereof increases when a fault occurs in the protected section,
   second means providing a restraining quantity in response to the absolute value of at least one of said near and far signals,
   and third means modifying one of said quantities with a predetermined constant such that the difference between the quantities is indicative of a fault in the protected section when said difference bears a predetermined relationship with a predetermined pick-up value, with the magnitude of said modifying constant being determinative of the tripping characteristic of the protective relay system.

2. The protective relay system of claim 1 wherein the second means provides the restraining quantity in response to the larger of the near and far signals.

3. The protective relay system of claim 1 wherein the second means provides the restraining quantity in response to the sum of the absolute values of the near and far signals.

4. The protective relay system of claim 3 wherein the operating quantity, restraining quantity and modifying constant are represented by $V_{op}$, $V_R$ and G, respectively, and wherein the modifying constant G is greater than unity, and it is applied in the relationship $V_{op}=V_R/G$.

5. The protective relay system of claim 1 wherein the alternating current transmission line section includes three terminal lines, the line current deriving means provides a near, and first and second far composite signals, the communication means communicates the first and second far signals to the near end, and the first means provides an operating quantity in response to the absolute value of the vector combination of the near, and first and second far signals.

6. The protective relay system of claim 5 wherein the second means provides the restraining quantity in response to the largest of the near, and first and second far signals.

7. The protective relay system of claim 5 wherein the second means provides the restraining quantity in response to the sum of the absolute values of the near, and first and second far signals.

8. The protective relay of claim 7 wherein the operating quantity, restraining quantity and modifying constant are represented by $V_{op}$, $V_R$ and G, respectively, and wherein the modifying constant is greater than unity, and it is applied in the relationship $V_{op}=V_R/G$.

9. The protective relay system of claim 1 including fourth means providing a first signal responsive to the difference between the operating and restraining quantities, after modification by the modifying constant, fifth means providing a predetermined pick-up value, and sixth means comparing the first signal with the predetermined pick-up value and providing a second signal indicating a fault in the protected section when the first signal is equal to or greater than the predetermined pick-up value.

10. The protective relay system of claim 1 wherein the communication means also communicates the near signal to the far end, and including means at the far end similar to the first, second and third means.

11. The protective relay system of claim 1 wherein the alternating current transmission line section includes three terminal lines, the line current deriving means provides a near, and first and second far composite sequence signals, the communication means communicates the first and second far signals to the near end, the near and second far end signals to the first far end, and the near and first far end signals to the second far end, and means at each far end similar to the first, second and third means.

* * * * *